INVENTORS
Bryan E. House
James C. Cumming
BY
Strauch, Nolan & Neale
ATTORNEYS

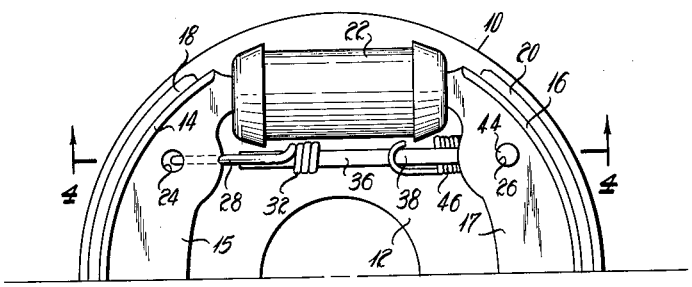
Oct. 9, 1962 — B. E. HOUSE ET AL — 3,057,439
AUTOMATIC BRAKE ADJUSTMENT
Filed May 7, 1959 — 4 Sheets-Sheet 1
INVENTORS
BRYAN E. HOUSE
JAMES C. CUMMING
BY
Strauch, Nolan & Neale
ATTORNEYS Oct. 9, 1962　　　B. E. HOUSE ET AL　　　3,057,439
AUTOMATIC BRAKE ADJUSTMENT Filed May 7, 1959　　　　　　　　　　　　　　4 Sheets-Sheet 2

Oct. 9, 1962  B. E. HOUSE ET AL  3,057,439
AUTOMATIC BRAKE ADJUSTMENT
Filed May 7, 1959  4 Sheets-Sheet 3
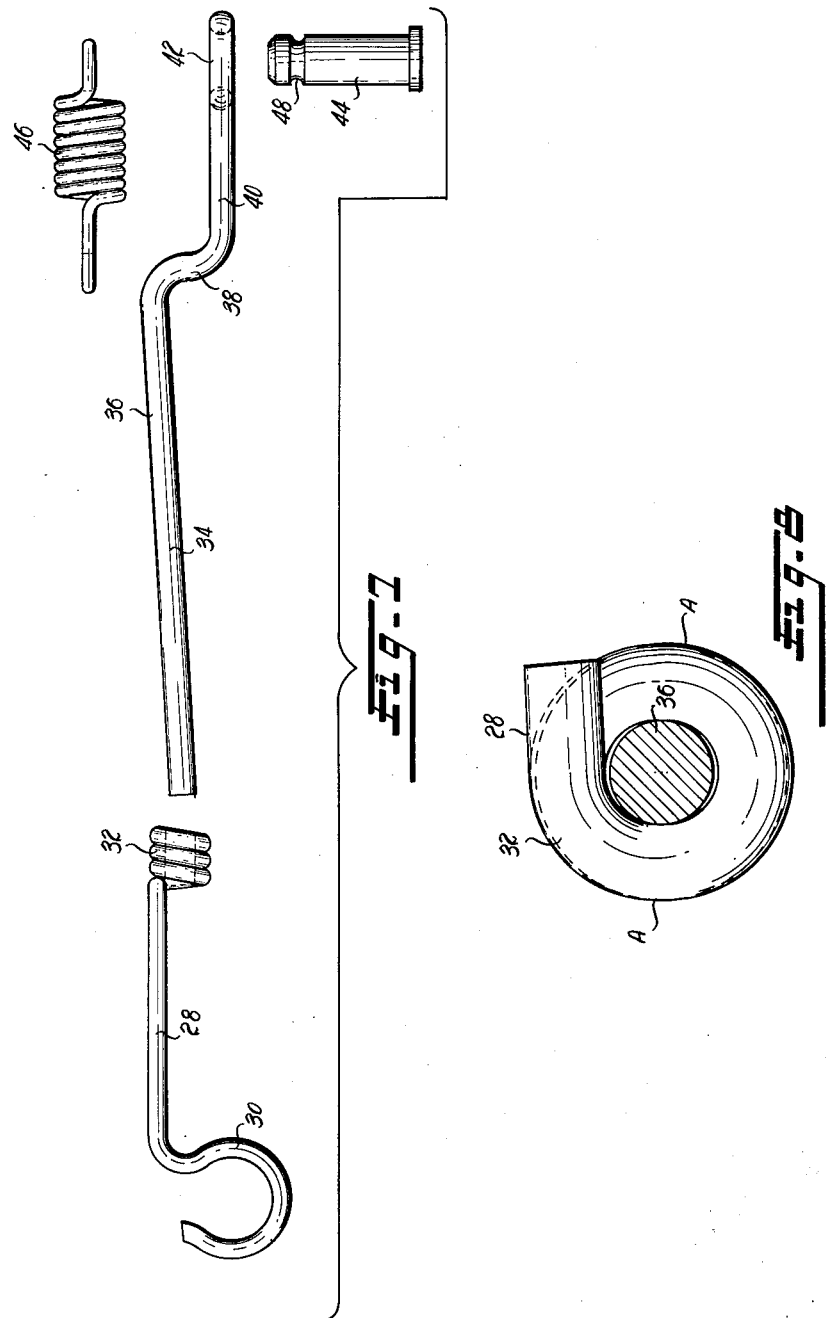
INVENTORS
Bryan E. House
James C. Cumming
BY
Strauch, Nolan & Neale
ATTORNEYS Oct. 9, 1962 B. E. HOUSE ET AL 3,057,439
AUTOMATIC BRAKE ADJUSTMENT
Filed May 7, 1959 4 Sheets-Sheet 4

INVENTORS
BRYAN E. HOUSE
BY JAMES C. CUMMING
Strauch, Nolan & Neale
ATTORNEYS

United States Patent Office 3,057,439
Patented Oct. 9, 1962

3,057,439
AUTOMATIC BRAKE ADJUSTMENT
Bryan E. House, Birmingham, and James C. Cumming, Detroit, Mich., assignors to Rockwell-Standard Corporation, Coraopolis, Pa., a corporation of Pennsylvania
Filed May 7, 1959, Ser. No. 811,702
5 Claims. (Cl. 188—79.5)

The present invention refers to an automatic adjustment for vehicle brakes and more particularly to a spring and spike connected automatic brake shoe clearance adjuster.

The available space inside a conventional internally expanding vehicle wheel brake is in most cases very limited and it is therefore difficult in many instances to find space for incorporating automatic brake adjusting means. Many automatic adjusting means proposed are moreover of a complex nature, expensive and cumbersome to install and difficult to repair or service. The present invention utilizes substantially only the space now occupied by the conventional brake shoe return spring to provide a compact combination of an automatic adjusting means and brake shoe return spring.

Accordingly a primary object of the present invention is to provide an automatic brake adjustment comprising a novel expandible or extensible linkage and return spring arrangement extending between the brake shoes operative particularly to provide a return stop of the brake shoes to predetermine the released position thereof.

Another object of the invention is to provide a novel linkage and spring arrangement in a brake assembly including one rod attached to one brake shoe, a friction clutch element on the one rod and a link rod engaging the friction clutch and attached to the opposite brake shoe and a return spring between the link rod and the latter brake shoe.

A further object of the invention is to provide a novel automatic brake shoe adjustment which insures that the range of brake shoe movement by the actuator is substantially the same regardless of brake shoe lining wear.

It is a further object of the invention to provide a novel automatic brake shoe adjustment wherein oppositely movable brake shoes which are moved by an actuator from a retracted position into engagement with a drum are interconnected by mechanism providing opposed abutments defining brake shoe movement within a predetermined optimum range, said mechanism being extensible to reposition said abutments when movement of said shoes by said actuator to engage the drum exceeds said range.

A further object of the present invention is to provide a novel mechanically simple automatic brake adjustment means comprising only few parts and requiring no extra space within the brake mechanism and which can be easily applied to existing as well as new brake installations, and which is inexpensive to manufacture and install.

Another object of the present invention is to provide a novel spring-linkage automatic brake adjustment which can be applied to any brake actuating mechanism, such as mechanical, hydraulic, or pneumatic.

Those and further objects and features of the present invention will become evident by the following description in connection with the appended drawings which show several forms of embodiments by way of illustration and in which:

FIGURE 1 is a fragmentary elevation of the upper half of a vehicle brake illustrating a preferred embodiment of invention;

FIGURE 2 is a view similar to FIGURE 1 but showing a different embodiment;

FIGURE 3 is a view similar to FIGURE 1 but showing still another embodiment;

FIGURE 7 is an enlarged exploded view of the parts of the brake adjusting assembly of FIGURE 1;

FIGURE 8 is an enlarged vertical section through the spring and link connection along line 8—8 of FIGURE 4;

The same numerals refer to the same or similar parts throughout the description.

Figure 4:
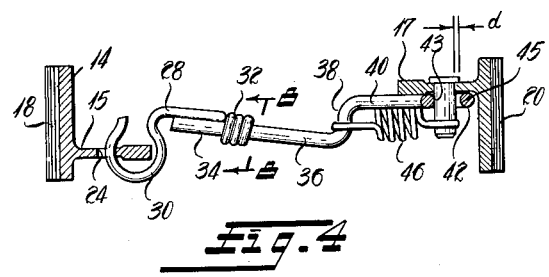
FIGURE 4 is a section along line 4—4 through the brake adjusting means of FIGURE 1.

Although the invention is illustrated in the drawings and will be described as applied to a hydraulically actuated brake mechanism it is emphasized again that it is not so limited but may be equally well applied to mechanical or pneumatic brakes.

Referring to FIGURES 1, 4, 7 and 8 a conventional wheel brake assembly comprises a brake drum 10 that rotates with the wheel (not shown). The brake mechanism comprises an axle mounted stationary backing plate 12 which supports arcuate brake shoes 14 and 16 having offset brake shoe webs 15 and 17. Brake shoes 14 and 16 are provided with linings 18 and 20 to frictionally contact the drum 10 under influence of hydraulic pressure exerted on their free ends by a hydraulic brake wheel cylinder 22. The other ends of the brake shoes (not shown) are suitably pivoted on plate 12, substantially as well known in brake constructions of this type. At opposite ends the hydraulic cylinder contains piston rods (not shown in FIGURES 1 and 3 but one type being shown at 23 in FIGURE 2) which are oppositely outwardly displaced when cylinder 22 is actuated to apply the brake shoes to drum 10.

Brake shoe webs 15 and 17 are provided adjacent their free ends with mounting holes 24 and 26 respectively to which is attached the brake adjustment mechanism of the invention.

Attached to brake shoe web 15 is a stiff wire rod 28 having an outer end 30 hooked into hole 24 and a coiled spring end 32 consisting of but few coils and defining a friction clutch socket as will appear. Extending into the coiled end 32 of rod 28 is the longer cylindrical end 34 of a linkage rod 36 which is preferably made of stiff wire of slightly larger diameter than the wire diameter of rod 28 and which is securely held in coil 32 under a predetermined friction pressure as will appear.

An intermediate S-bent section 38 connects the longer end 34 of rod 36 with the shoe attaching end 40 which has a closed loop 42 surrounding a fixed pin 44 press-fitted into hole 26 of brake shoe web 17.

Rods 28 and 36 serve as an adjustable length connection between the brake shoes defining an effective range of movement of the shoes for optimum operation to maintain at all times a predetermined clearance between the brake shoe linings and the brake drum and to insure that the brake shoes have substantially only the same degree of movement by the actuator regardless of lining wear.

The S-bend 38 of rod 36 provides an abutment for attachment of one end of a return spring 46 which has its other end attached about a surface groove 48 in pin 44. Spring 46 is always under tension in the assembly tending to move the brake shoes toward each other when hydraulic pressure of the actuator is released.

FIGURE 7 shows more clearly in detail the several parts which make up this novel brake adjustment and return spring assembly. It will be noted that considering rod end 40 as lying in a plane perpendicular to the path of brake shoe movement the longer free end 34 of link rod 36 is inclined at an acute angle to that plane. It will also be noted that the S-bent rod section lies opposite and generally parallel to pin 44 so that spring 46 is stretched between them. The frictional holding force of clutch 32 and rod end 34 is greater than the pull of spring 46 so that spring 46 is never effective to vary the length of the rod assembly 28, 36.

The parts are shown in brake released position in FIGURES 1 and 4. No pressure is now being exerted by the actuator 22, and the return spring 46 is fully effective to pull the brake shoes toward each other. It will be observed that the diameter of loop 42 is greater than that of pin 44 by a small distance indicated at $d$ in FIGURE 4 and that under brake released condition the pin 44 abuts the inner side of loop 42 at 43, and the ends of longitudinally solid rod assembly 28, 36 define the relaxed positions of the brake shoes.

When actuator 22 is actuated to force the brake shoes equally apart relative movement takes place between pin 44 and loop 42, pin 44 moving outwardly from abutment 43. This further tensions spring 46. The parts are so proportioned that when the brakes are in proper adjustment the linings will engage the drum at the same time when pin 44 abuts the outer side of loop 42 at 45. Thus when the brakes are in proper adjustment there is no extension of the rod assembly 28, 36 which remains of constant effective length. The force necessary to stretch spring 46 through the distance $d$ is not enough to slip the clutch connection at 32. When the actuator is released the parts return to FIGURE 4 condition.

However, should the lining be worn, the actuator must move the brake shoes through greater distances to contact the drum. Now pin 44 engages abutment 45 and the great force of the actuator 22 becomes effective to displace rod 36 through socket clutch 32 until brake action occurs. But now when the actuator is released the rod assembly 28, 36 remains extended in length, abutments 43 and 45 being repositioned outwardly and return movement of the shoes is arrested by abutment of pin 44 at 43 so that in the new relaxed position the brake shoes are farther apart than before. When the brakes are again actuated the shoes move only through their normal range, and rod assembly 28, 36 remains of fixed length until further lining wear results in further repositioning of the abutments 43 and 45 as described in the foregoing. It will be appreciated that the movement of the brake shoes from relaxed to drum engaging position is always only a small fraction of an inch, and in the invention the amount of brake shoe movement during each brake application is maintained substantially constant.

There is normally no relative sliding movement between the rod 28 and rod 36 for reason that the coiled spring end 32 of rod 28 grips the rod end 34 with such pressure as to withstand any separating movement by the normal brake applying force. This gripping contact between the coil spring 32 and rod end 34 is accomplished in the following manner, referring to FIGURE 8. During assembly the cylindrical link rod end 34 is inserted into the slightly oversize cylindrical bore of wound wire coil 32 of rod 28 for a distance coresponding to the normal retracted distance between the brake shoes to the position shown in FIGURE 4. At this point the rod end 34 is a snug sliding fit into coil 32. Then the coil 32 is flattened by a force applied in the plane indicated at "A" in such manner as to reduce one dimension of the coil bore to exert sufficient friction drag on rod end 34 which will withstand sliding movement on link rod 36 under normal brake operation. Another method of providing this friction drag may be employed by flattening or coining the link rod end 34 prior to winding the coil end 32 of rod 28 around it in such manner as to achieve the same result. In any event there is provided between the rod 36 and rod 28 a friction clutch that holds the rods against relative sliding movement during the foregoing normal conditions of brake operation but which permits relative sliding under the pull of the actuator as described. Rod end 34 extends through coil 32 sufficiently that the two are never separated during brake operation.

Figure 5:
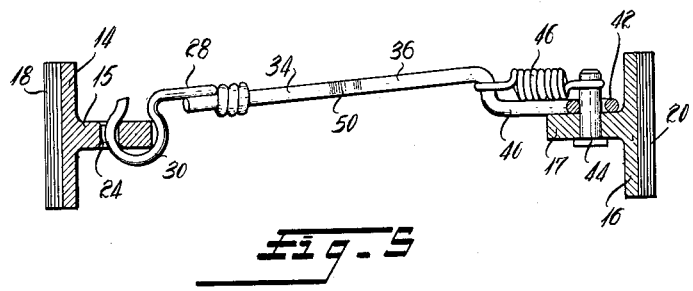
FIGURE 5 is a section along line 5—5 through the brake adjusting means of FIGURE 2.

FIGURES 2 and 5 show the invention as applied to a slightly different brake construction having centered brake shoe webs. In this embodiment the longer free end 34 of link rod 36 is in the center of the brake and bent at an angle as at 50 to clear the larger opening 52 in backing plate 12.

Figure 6:
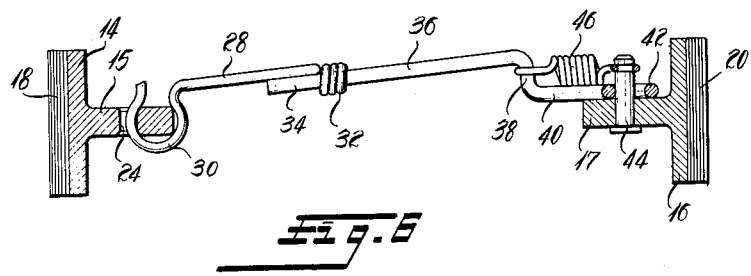
FIGURE 6 is a section along line 6—6 through the brake adjusting means of FIGURE 3.

FIGURES 3 and 6 show another brake embodiment similar to FIGURES 1 and 4 with the exception that centered brake shoe webs are provided as in FIGURES 2 and 5.

In all foregoing embodiments it may be desirable to locate the coil 32 on the rod 36 and project a straight end of rod 28 into the coil, which is essentially the reverse of the structure shown in the drawings, the rod wire sizes being suitably chosen.

Figure 9:
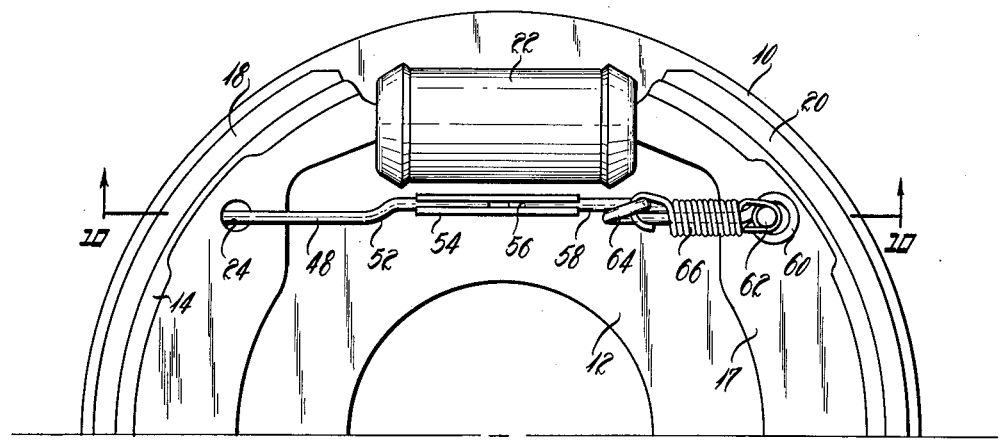
FIGURE 9 is a further fragmentary elevation view similar to FIGURE 1 showing a second preferred embodiment utilizing a different spring clutch.
Figure 10:
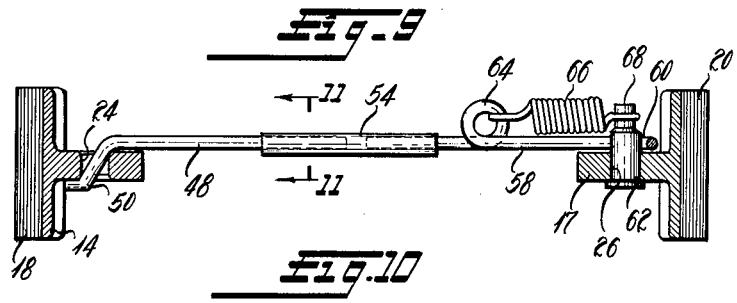
FIGURE 10 is a section taken on line 10—10 of FIGURE 9.
Figure 11:
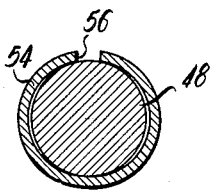
FIGURE 11 is an enlarged vertical section, taken on line 11—11 of FIGURE 10, through the rolled spring clutch element.

FIGURES 9 to 11 show another preferred form of embodiment of the spike-linkage adjustment mechanism. In this embodiment a first linkage rod 48 with angularly bent end section 50 projects into hole 24 of brake shoe web 15 to be retained thereby. The other end of linkage rod 48 is slightly bent upwards, as at 52 (FIGURE 9), and projects into a metal sleeve spring 54, of relatively thin wall thickness, which firmly grips the rod 48 under a predetermined friction pressure. Sleeve 54 is the equivalent of the coiled end 32 of rod 28 in the other embodiments. The sleeve 54 is provided with a longitudinal compensating gap 56 to account for manufacturing tolerance and to provide a clamping effect on both linkage rods. A second linkage rod 58 projects into the other end of sleeve 54, the free end of rod 58 being provided with a closed loop 60 surrounding a fixed pin 62 press-fitted into hole 26 of the other brake shoe web 17. Linkage rod 58 is provided intermediate its ends with a circular coiled loop 64 which serves as attachment for one end of a brake shoe return spring 66 which has its other end attached to the reduced end 68 of pin 62.

FIGURE 11 shows in slightly exaggerated and enlarged illustration the gripping contact between the sleeve 54 and rods 48, 58. The rods are inserted in the sleeve and the sleeve is then pressed on to the rods in a vertical direction in FIGURE 11 to provide a sufficient friction drag on rods 48 and 58.

The sleeve 54 is of such length that the rods 48, 58 will not be separated therefrom even if the brake lining is completely worn off.

The operation of this device is essentially the same as described for the other embodiments. It will be seen from FIGURE 10 that both linkage rods 48 and 58 are in a common horizontal plane securing an even force distribution parallel to the direction of brake shoe application. It will be appreciated that both rods 48 and 58 of this embodiment are of the same wire gauge thickness which greatly facilitates manufacturing processes.

An important feature on all of the embodiments is in the use of a smaller return spring 46 and 66 than is generally necessary in expanding shoe brakes. The return spring can be made smaller because it is not required to keep growing in dimension as the lining wears. In other words it works in the same range for all degrees of lining wear due to clearance "$d$".

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An automatic wear adjuster for a brake assembly of the type characterized by at least two relatively movable brake shoes mounted for movement between retracted position and drum engaging position and an actuator for oppositely moving said shoes into drum engaging position, comprising:

(a) relatively stiff rods operatively connected at opposite outer ends to said brake shoes and having a sliding frictional clutch connection between their other ends, (b) lost motion means in the connection between only one of said rods and the associated one of said brake shoes permitting relative movement of said brake shoes through a predetermined range without causing relative movement of said rods at said clutch connection, (c) a single return spring operatively connected between said one of said rods and said associated one of said brake shoes, (d) said return spring being energized during said range of brake shoe movement, (e) and means in said lost motion means responsive to relative movement of said brake shoes beyond said range for applying the force of said actuator to relatively oppositely move said rods at said clutch conection whereby the outer ends of the respective rods are repositioned in further apart relationship to locate and hold both brake shoes in adjusted separated relation when said brake shoes return to retracted position under the force of said return spring.

2. In the automatic wear adjuster defined in claim 1, said sliding frictional connection between said rods comprising a spring coil formed on one of said rods and a straight end on the other of said rods frictionally received within said coil.

3. In the automatic wear adjuster defined in claim 1, said one of said rods having a laterally bent portion, and said return spring being connected between said bent portion and said associated brake shoe.

4. In the automatic wear adjuster defined in claim 1, said sliding frictional connection comprising a spring sleeve extending between the rod ends and having a sliding frictional fit with at least one of said rod ends.

5. In the automatic wear adjuster defined in claim 1, the frictional holding force of said sliding connection being sufficiently greater than the force of the return spring during brake operation that said spring is ineffective to cause relative sliding of said rods.

References Cited in the file of this patent

UNITED STATES PATENTS

| | | |
|---|---|---|
| 1,825,555 | Stern | Sept. 29, 1931 |
| 2,196,137 | Brown | Apr. 2, 1940 |
| 2,273,223 | Sawtelle | Feb. 17, 1942 |
| 2,386,913 | Sawtelle | Oct. 16, 1945 |
| 2,570,398 | Smith | Oct. 9, 1951 |
| 2,789,666 | Burnett | Apr. 23, 1957 |
| 2,861,657 | Curtis et al. | Nov. 25, 1958 |
| 2,870,877 | Voigt | Jan. 27, 1959 |
| 2,875,860 | Eckardt et al. | Mar. 3, 1959 |

FOREIGN PATENTS

| | | |
|---|---|---|
| 812,003 | Great Britain | Apr. 15, 1959 |